United States Patent
Kalamatianos et al.

(10) Patent No.: US 11,550,588 B2
(45) Date of Patent: Jan. 10, 2023

(54) BRANCH TARGET FILTERING BASED ON MEMORY REGION ACCESS COUNT

(71) Applicant: ADVANCED MICRO DEVICES, INC., Santa Clara, CA (US)

(72) Inventors: John Kalamatianos, Boxborough, MA (US); Adithya Yalavarti, Boxborough, MA (US); Varun Agrawal, Boxborough, MA (US); Subhankar Pal, Boxborough, MA (US); Vinesh Srinivasan, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 84 days.

(21) Appl. No.: 16/109,195

(22) Filed: Aug. 22, 2018

(65) Prior Publication Data

US 2020/0065106 A1 Feb. 27, 2020

(51) Int. Cl.
*G06F 9/38* (2018.01)
*G06F 11/34* (2006.01)
*G06F 1/32* (2019.01)
*G06F 1/3287* (2019.01)

(52) U.S. Cl.
CPC .............. *G06F 9/3806* (2013.01); *G06F 1/32* (2013.01); *G06F 1/3287* (2013.01); *G06F 9/3844* (2013.01); *G06F 11/34* (2013.01)

(58) Field of Classification Search
CPC ........ G06F 1/32; G06F 1/3287; G06F 9/3806; G06F 9/3844; G06F 9/3846; G06F 9/3848; G06F 11/34; G06F 2201/81; Y02D 10/00
See application file for complete search history.

(56) References Cited

U.S. PATENT DOCUMENTS

| | | | | |
|---|---|---|---|---|
| 5,506,976 A | * | 4/1996 | Jaggar | G06F 9/3806 711/137 |
| 6,282,614 B1 | | 8/2001 | Musoll | |
| 7,681,021 B2 | * | 3/2010 | Schuler | G06F 9/3806 712/238 |
| 10,001,998 B2 | * | 6/2018 | Zhang | G06F 9/3861 |
| 2005/0066154 A1 | * | 3/2005 | Chung | G06F 9/3848 712/239 |
| 2007/0130450 A1 | | 6/2007 | Chiao et al. | |
| 2012/0311308 A1 | * | 12/2012 | Xekalakis | G06F 9/30145 712/239 |

(Continued)

OTHER PUBLICATIONS

International Search Report and Written Opinion dated Oct. 4, 2019 for International Application No. PCT/US2019/038179, 11 pages.

(Continued)

*Primary Examiner* — David J. Huisman (57) ABSTRACT

A branch predictor of a processor includes one or more prediction structures, including a predicted branch address and predicted branch direction, that identify predicted branches. To reduce power consumption, the branch predictor selects one or more of the prediction structures that are not expected to provide useful branch prediction information and filters the selected structures such that the filtered structures are not used for branch prediction. The branch predictor thereby reduces the amount of power used for branch prediction without substantially reducing the accuracy of the predicted branches.

14 Claims, 6 Drawing Sheets

(56) References Cited

U.S. PATENT DOCUMENTS

| | | | |
|---|---|---|---|
| 2013/0145135 A1* | 6/2013 | Bell, Jr. | ............. G06F 11/3409 |
| | | | 712/239 |
| 2013/0290676 A1 | 10/2013 | Aggarwal et al. | |
| 2013/0339693 A1 | 12/2013 | Bonanno et al. | |
| 2013/0339695 A1* | 12/2013 | Bonanno | ............ G06F 9/30047 |
| | | | 712/239 |
| 2015/0331691 A1 | 11/2015 | Levitan et al. | |
| 2016/0110202 A1 | 4/2016 | Filippo et al. | |
| 2017/0344372 A1* | 11/2017 | Levitan | ................. G06F 9/3848 |
| 2020/0012497 A1* | 1/2020 | Clouqueur | .......... G06F 9/30058 |

OTHER PUBLICATIONS

International Preliminary Report on Patentability dated Mar. 4, 2020 in Application No. PCT/US2019/038179, 8 pages.

Mosull, Eric "Predicting the Usefulness of a Block Result: A Micro-Architectural Technique for High-Performance Low-Power Processors," Proceedings of the 32nd Annual ACM/IEEE International Symposium on Microarchitecture. Haifa, IL, Nov. 16, 1999, 10 pages.

Partial European Search Report issued in Application No. 19852753. 3., dated Apr. 19, 2022, 15 pages.

Extended European Search Report issued in Application No. 19852753. 3, dated Jul. 1, 2022, 15 pages.

Huang et al. "An Energy-Efficient Branch Prediction with Grouped Global History" 44th International Conference on Parallel Processing, 2015, 10 Pages.

\* cited by examiner

BRANCH TARGET FILTERING BASED ON MEMORY REGION ACCESS COUNT

GOVERNMENT LICENSE RIGHTS

This invention was made with Government support under PathForward Project with Lawrence Livermore National Security (Prime Contract No. DE-AC52-07NA27344, Subcontract No. B620717) awarded by DOE. The Government has certain rights in this invention.

BACKGROUND

Description of the Related Art

To increase processing efficiency, a processor can employ one or more predictive processing techniques. One type of predictive processing technique is referred to as branch prediction, whereby the processor predicts the outcome of a branch instruction so that the processor can begin speculatively executing subsequent instructions along the predicted branch before the processing unit has evaluated the branch instruction. To support branch prediction, the processor employs a branch target structure, referred to as a branch target buffer (BTB), and a branch direction predictor. The BTB stores address information for predicted branches while the branch direction predictor predicts whether a given branch is expected to be taken. However, conventional branch prediction structures can consume an undesirable amount of power.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-6 illustrate techniques for reducing power consumption at a branch predictor of a processor. The branch predictor includes one or more prediction structures, including a predicted branch address and predicted branch direction, to identify predicted branches. To reduce power consumption, the branch predictor selects one or more of the prediction structures that are not expected to provide useful branch prediction information and filters the selected structures such that the filtered structures are not used for branch prediction. The branch predictor thereby reduces the amount of power used for branch prediction without substantially reducing the accuracy of the predicted branches.

To illustrate, in some embodiments, the branch predictor includes two branch target buffers (BTBs) organized into levels—thus, one of the BTBs is a level 1 (L1) BTB and the other is a level 2 (L2) BTB. The L2 BTB is larger than the L1 BTB but is slower to access than the L1 BTB. Conventionally, to identify a predicted branch address the branch predictor accesses both the L1 and L2 BTBs for each fetched instruction address at the processor. However, for fetched instruction addresses that are likely to hit (i.e., be identified as stored) in the L1 BTB, the concurrent access to the L2 BTB unnecessarily consumes power. Further, in many cases a fetched instruction address is more likely to hit in the L1 BTB when previous fetched instruction addresses in close spatial proximity, in a virtual address space, also hit in the L1 BTB. In other words, L1 BTB hits are likely to increase when the fetched instruction addresses have relatively high spatial code locality. Accordingly, using the techniques described herein, the branch predictor keeps counts of accesses to the same memory space regions (referred to herein as pages) and, when a count exceeds a threshold, suppresses accesses to the L2 BTB for fetched addresses in the corresponding memory page. The branch predictor thereby reduces unnecessary accesses to the L2 BTB, thus reducing dynamic power consumption at the processor.

As another example, in some embodiments the branch predictor employs a base predictor and a plurality of direction tables to predict a branch direction, whereby each direction table is a tagged table that independently predicts the direction of a branch based on history of fetched instruction addresses stored at the direction table. For a fetched instruction address, the branch predictor identifies the set of tables that hit on the tag associated with the fetched instruction address. The branch predictor combines the prediction generated by the base predictor with the prediction from each of the identified set of tables to generate a combined prediction. However, some of the prediction tables are unlikely to hit on a given stream of fetched instruction addresses. Accordingly, to reduce power consumption, the branch predictor predicts whether each direction table is predicted to hit, either for a specified period of time, for a given instruction address, or a combination thereof. The branch predictor disables those direction tables that are not predicted to hit and are therefore unlikely to provide useful branch direction information. The branch predictor thereby reduces the overall number of accesses to the plurality of direction tables, thus reducing power without substantially reducing branch prediction accuracy.

Figure 1:
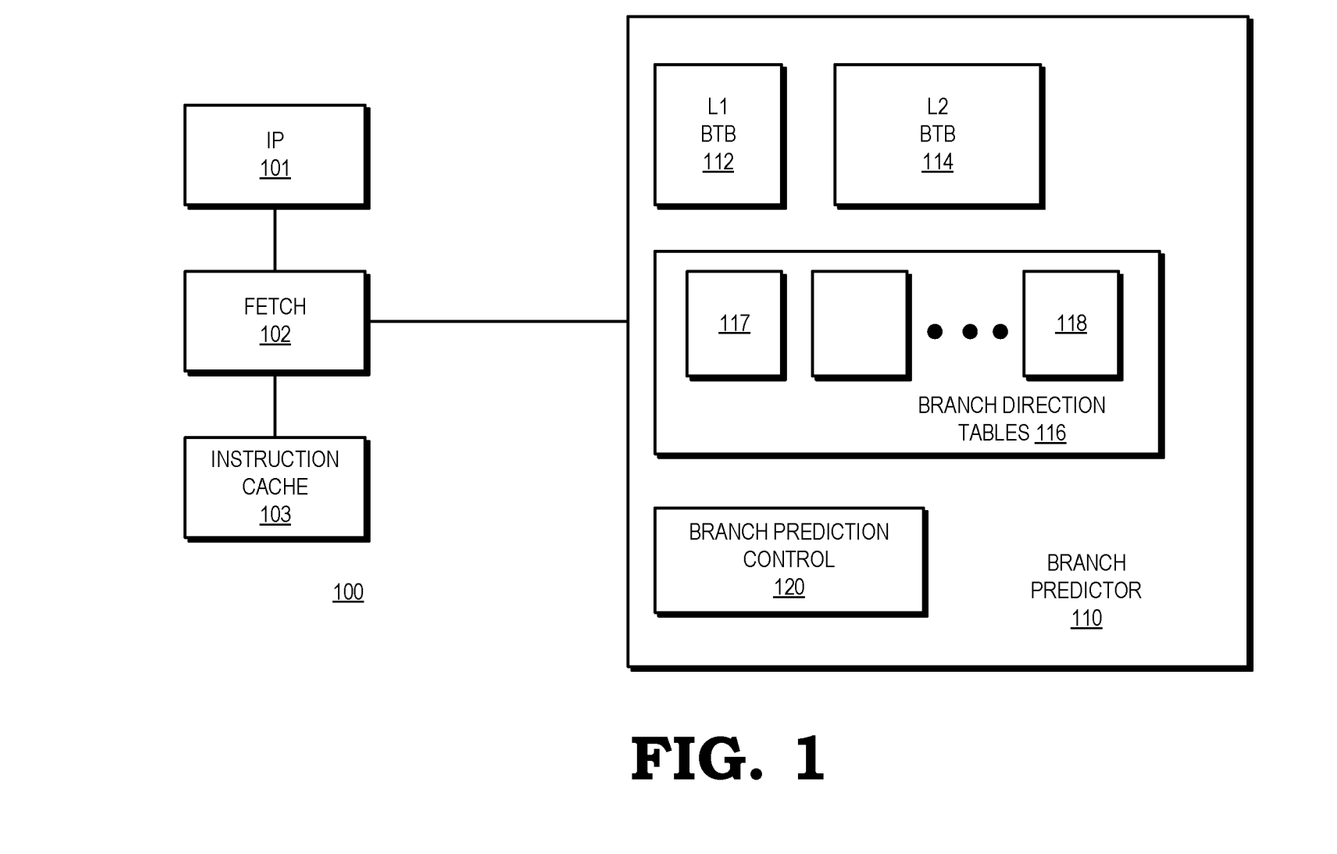
FIG. 1 is a block diagram of a processor including a branch predictor with filtered branch prediction structures in accordance with some embodiments.

FIG. 1 illustrates a processor 100 that includes filtered branch prediction structures in accordance with some embodiments. As used herein, a branch prediction structure is a filtered structure when the branch prediction structure's influence on branch prediction at the processor 100 is able to be selectively enabled and disabled. As described further herein, the processor 100 filters a branch prediction structure, such that the structure does not influence branch prediction, in one or more of a number of ways, including suppressing access to the structure, disabling the structure (e.g., placing the structure in a low-power state) or a combination thereof.

The processor 100 executes sets of instructions (e.g., computer programs) to carry out specified tasks on behalf of an electronic device. In some embodiments, the processor 100 is incorporated in one of a variety of electronic devices, such as a desktop or laptop computer, server, game console, smartphone, tablet, and the like. To support execution of instructions, the processor 100 includes an instruction pipeline having an instruction fetch stage 102 and additional pipeline stages (not shown). The additional pipeline stages include stages to decode fetched instructions into sets of operations, execution stages to execute the decoded operations, and a retire stage to retire executed instructions. It will be appreciated that in some embodiments the processor 100 includes additional modules to support execution of instructions, including one or more memory controllers, input/output controllers, memory structures (e.g., one or more caches) and the like. In addition, it will be appreciated that in some embodiments the processor 100 includes additional instruction pipelines. For example, in some embodiments the processor 100 includes multiple processor cores, with each processor core having at least one instruction pipeline to execute sets of instructions. Moreover, in some embodiments the processor 100 includes additional processing units specifically designed to execute operations associated with special tasks, such as one or more graphics processing units (GPUs) to execute operations associated with drawing, display, and other graphics operations.

Returning to the illustrated embodiment of FIG. 1, the instruction fetch stage 102 retrieves (fetches) instructions from an instruction cache 103 based on an instruction pointer 101. As will be appreciated by one skilled in the art, the instruction pointer 101 is an address value indicating the current instruction(s) to be fetched and is modified by executing selected operations to modify the program flow of the instructions being executed. For example, in some embodiments branch instructions modify the instruction pointer 101 based, for example, on evaluation of data specified by the branch instruction or an associated instruction.

To support high instruction fetch bandwidth, the processor 100 includes a branch predictor 110 that predicts whether a given fetched instruction corresponds to a branch instruction, predicts the direction of a given branch instruction (that is, whether the given branch instruction is taken or not taken), and predicts the target address of the given branch instruction if it is predicted to be taken. The branch predictor 110 includes a number of modules and structures to support branch prediction, including an L1 BTB 112, an L2 BTB 114, branch direction tables 116, and a branch prediction control module 120. The branch prediction control module 120 manages operations of the branch predictor 110, including enabling or disabling branch prediction structures, suppressing access to branch prediction structures, managing data stored at the branch prediction structures, and other management operations as described further herein.

The L1 BTB 112 and the L2 BTB 114 each include a plurality of entries with each entry corresponding to a different instruction pointer value that is predicted to be a branch instruction. In at least one embodiment, the branch prediction control module 120 manages entries of the L1 BTB 112 and the L2 BTB 114 so that the L2 BTB 114 is a victim buffer for the L1 BTB 112. In some embodiments the L2 BTB 114 is a larger structure, and contains more entries than, the L1 BTB 112. As the branch prediction control module 120 evicts data from the L1 BTB 112 based on specified conditions (such as new data being moved into the L1 BTB 112), the branch prediction control module 120 moves the evicted data to the L2 BTB 114.

Each instruction cycle, the instruction fetch stage 102 provides the instruction pointer 101 to the branch predictor 110. In response, the branch prediction control module 120 determines if the L1 BTB 112 includes an entry corresponding to the fetched instruction address indicated by the instruction pointer 101. In response to identifying that an entry corresponds to the received instruction pointer value (referred to as a BTB hit) the branch prediction control module 120 retrieves a branch target address (BTA) from the identified entry and provides the BTA to the instruction fetch stage 102.

In addition to accessing the L1 BTB 112 for each fetched instruction address, the branch prediction control module 120 selectively accesses the L2 BTB 114 based on whether the access to the L2 BTB 114 is expected to be productive—that is, whether an access to the L2 BTB 114 is expected to result in a BTB hit. As described further below with respect to FIGS. 2 and 3, the branch prediction control module 120 maintains counts of hits at the L1 BTB 112 for fetched addresses that correspond to specified regions of virtual memory space, wherein the specified regions are referred to herein as memory pages. It will be appreciated that the memory pages monitored by the branch prediction control module 120 may be different than memory pages employed for other operations at the processor 100, such as memory pages maintained by an operating system executing at the processor 100.

In response to receiving a fetched instruction address, the branch prediction control module 120 identifies the memory page corresponding to the fetched instruction address and identifies the count corresponding to the identified memory page. In response to the count being below a threshold, the branch prediction control module 120 provides the fetched instruction address to the L2 BTB 114 concurrent with identifying if the fetched instruction address hits in the L1 BTB 112. In response to a hit at the L2 BTB 114, the branch prediction control module 120 retrieves a branch target address (BTA) from the identified entry of the L2 BTB 114 and provides the BTA to the instruction fetch stage 102.

In response to determining that the count for the identified memory page is above the specified threshold, the branch prediction control module 120 suppresses access to the L2 BTB 114 for the fetched instruction address by, for example, not providing the fetched instruction address to the L2 BTB 114. The branch prediction control module 120 thus ensures that the L2 BTB 114 is not accessed for fetched instruction addresses that are predicted to hit in the L1 BTB 112, thereby reducing power consumption at the processor 100.

In addition to providing BTAs to the fetch stage 102, the branch predictor 110 provides a branch direction prediction for each predicted branch instruction, wherein the branch direction prediction indicates whether the branch is predicted to be taken or not taken. To support prediction of branch direction, the branch predictor 110 includes branch direction tables 116. In at least one embodiment, the branch direction tables 116 form at least part of a tagged geometric length (TAGE) predictor, wherein each individual table (e.g., tables 117, 118) is a partially tagged predictor table that stores a global history of fetched instruction addresses that forms a geometric series. In addition, each table stores a different history according to the table's corresponding geometric series. Each entry of a table stores a useful bit, indicating if the corresponding entry is predicted to be useful in branch prediction, a counter to track a bias value of branch direction, and a tag indicating the virtual address associated with the entry.

The branch prediction control module manages the data stored at each of the branch direction tables 116. In at least one embodiment, the branch prediction control module analyzes patterns in branch instructions executed at the processor 100 over time, including which branch instructions are taken and which branch instructions are not taken, and updates the branch direction tables 116 based on the identified patterns. In at least one embodiment, the branch prediction control module 120 analyzes the executed instructions in blocks or sets, referred to herein as branch prediction windows, and accesses the branch direction tables 116 on each branch prediction window. Based on the identified patterns, the branch prediction control module updates the bias values, the useful bits, or the tag associated with one or more entries, or a combination thereof.

In at least one embodiment, the branch direction tables 116 are divided into two levels, designated level 1 (L1) and level 2 (L2) tables. During a prediction window, the branch prediction control module 120 accesses both the L1 and L2 tables in order to identify a direction prediction in response to one of the BTBs 112 and 114 indicating a branch in the prediction window. In some embodiments, the branch prediction control module 120 accesses each table using tags generated based on the path history associated with the prediction window (e.g., the control flow history associated with instructions that are included in the prediction window). Each of the branch direction tables 116 that has an entry with a matching tag provides the bias value stored at the corresponding entry to the branch prediction control module 120, which selects or combines the received bias values according to a specified branch prediction algorithm. The specific branch prediction algorithm varies depending on the design and application of the processor 100.

In some scenarios, the path history for a given prediction window is such that one or more of the branch direction tables 116 does not store an entry corresponding to the generated tags or provides branch prediction information that does not increase the accuracy of the branch direction prediction generated by the branch prediction control module 120. These one or more branch prediction tables do not provide useful branch prediction information for a given prediction window, or set of prediction windows, and therefore accesses to these branch prediction tables are referred to herein as "non-productive" reads. It will be appreciated that non-productive reads consume power in the processor 100 without substantially increasing the accuracy of branch prediction. Accordingly, as described further herein with respect to FIGS. 4-6, the branch predictor 110 selectively places one or more of the branch direction tables 116 into an inactive state based on a predicted likelihood that the selected branch prediction tables will cause non-productive reads. Branch prediction tables in the inactive state are not accessed by the branch prediction control module 120 and, in some embodiments, are placed in a low-power state, thereby conserving power. As explained further herein, the branch prediction control module 120 selects the branch prediction tables to be placed in the inactive state in one or more of a number of ways, such as based on the number of hits to each table during a set of prediction windows, based on pattern history of hits to the branch direction tables 116, or a combination thereof.

Figure 2:
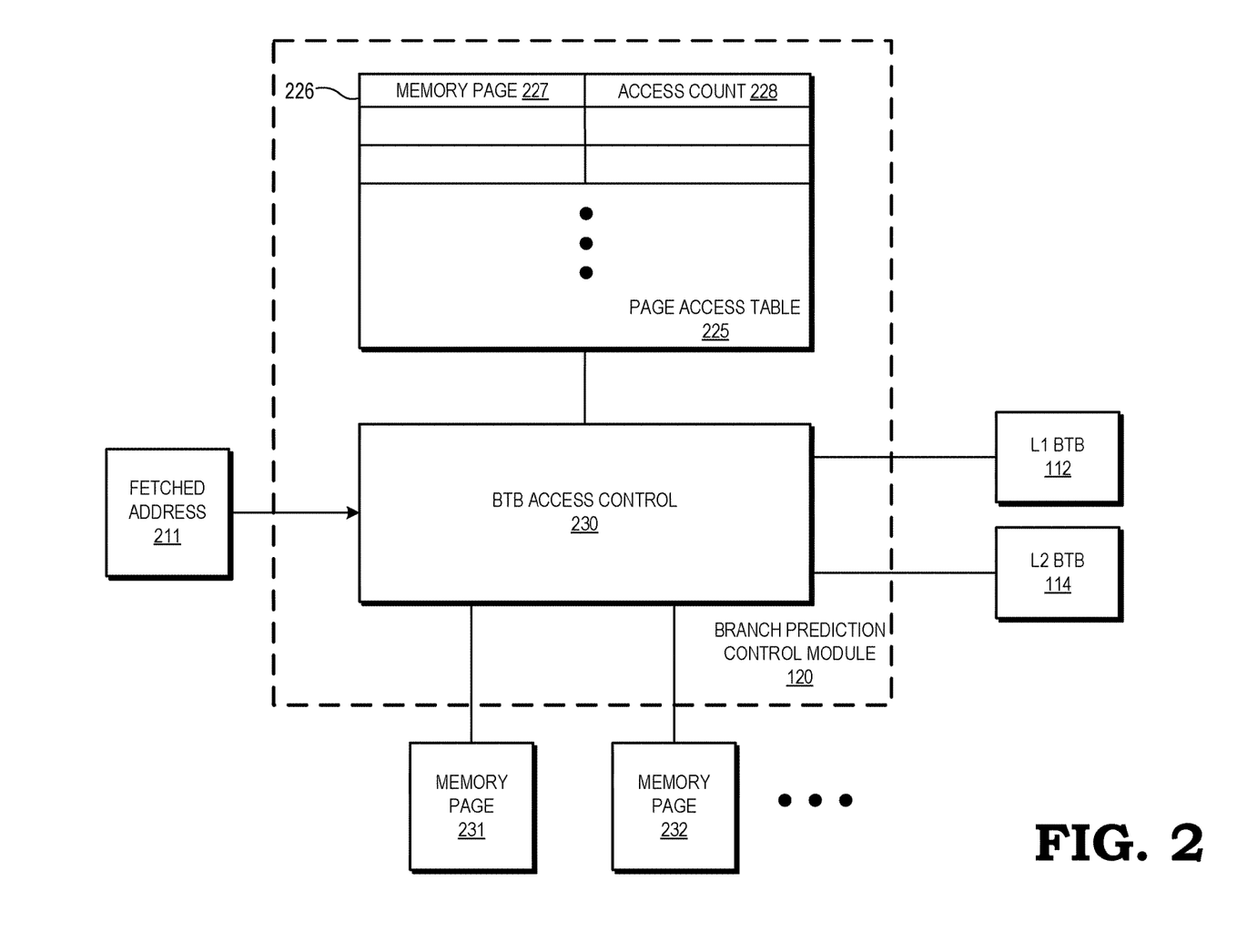
FIG. 2 is a block diagram of a portion of the branch prediction module of FIG. 1 illustrating filtered access to a branch target buffer in accordance with some embodiments.

FIG. 2 is a block diagram of portions of the branch predictor 110 of FIG. 1 to manage filtering of accesses to the BTB 114 in accordance with some embodiments. In the depicted example, the branch prediction control module includes a BTB access control module 230 and a page access table 225. The BTB access control module 230 controls access to the L2 BTB 114 based on received fetched instruction addresses (e.g. fetched address 211) and data stored at the page access table 225.

The page access table 225 includes a plurality of entries (e.g. entry 226), wherein each entry corresponds to a memory page (e.g., memory page 231). As noted above, in some embodiments the memory pages (e.g., memory pages 231, 232) correspond to memory pages employed by an operating system executing at the processor 100. In other embodiments, the memory pages 231, 232 do not correspond to memory pages employed by the operating system. In some embodiments, the size of each of the memory pages 231, 232 are configurable by a user or programmer of the processor 100.

Each entry of the page access table 225 includes a memory page identifier field (e.g., identifier field 227 of entry 226) and an access count field (e.g., access count field 228 of entry 226). The memory page identifier field 227 stores an identifier for the memory page corresponding to the entry and the access count field 228 stores the number of consecutive accesses to the memory page without a hit in the L2 BTB 114 as described further below. In operation, the BTB access control module 230 manages the entries and fields of the page access table 225, and filters accesses to the L2 BTB 114 based on the access counts for memory pages based on the page access table 225.

Figure 3:
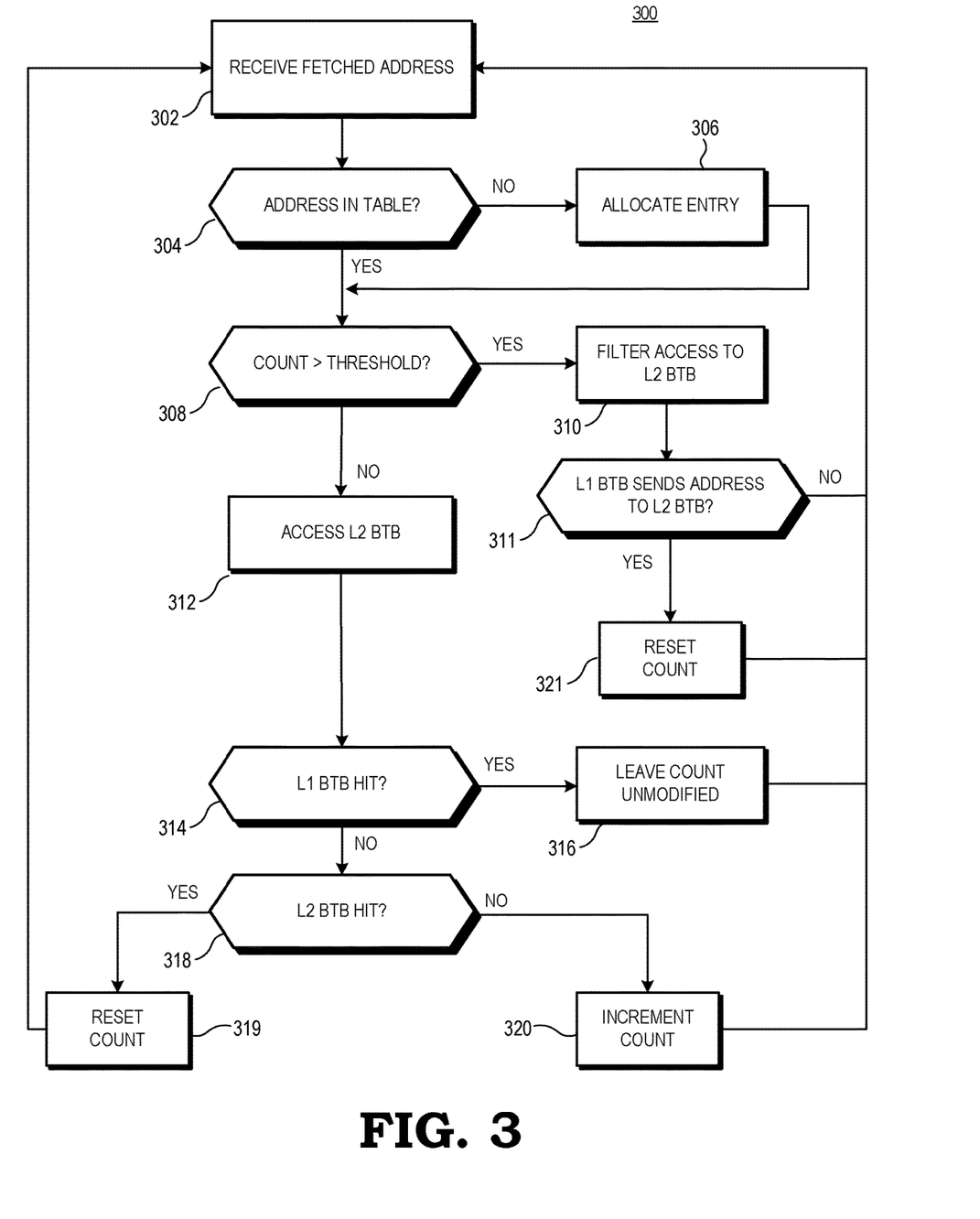
FIG. 3 is a flow diagram of a method of filtering access to a branch target buffer at a processor in accordance with some embodiments.

FIG. 3 illustrates a flow diagram of a method 300 of filtering accesses to the L2 BTB 114 in accordance with some embodiments. At block 302, the BTB access control module 230 receives a fetched instruction address (e.g., fetched address 211). At block 304, the BTB access control module 230 identifies the memory page corresponding to the fetched address and determines if the identified memory page has an entry at the page access table 225. If so, the method flow moves to block 308, described below. If the identified memory page does not have an entry at the page access table 225, the method flow moves to block 306 and the BTB access control module 230 allocates an entry at the page access table 225 for the identified memory page and sets the access count field for the allocated entry to an initial value (e.g., zero). In some cases, the access control module allocates the entry by replacing another entry using a specified replacement policy, such as a least recently used replacement policy. The method flow proceeds to block 308.

At block 308 the BTB access control module 230 determines if the access count field for the identified memory page is greater than a threshold value. If so, the method flow moves to block 310 and the BTB access control module 230 filters access to the L2 BTB 114 by, for example, not providing the fetched instruction address to the L2 BTB 114. The method flow moves to block 311 and the BTB access control module 230 determines if the L1 BTB 112 sends a BTA for the fetched instruction address to the L2 BTB 114. If not (that is, there is an L1 BTB miss for the fetched instruction address) the method flow returns to block 302. If there is an L1 BTB hit for the fetched instruction address and the L1 BTB 112 sends the L2 BTB 114 a BTA for the fetched instruction address, the method flow moves to block 321 and the BTB access control module 230 resets the access count field for the identified memory page to the initial value. The method flow returns to block 302.

Returning to block 308, if the BTB access control module 230 determines that the access count for the identified memory page is at or below the threshold, the method flow proceeds to block 312 and the BTB access control module 230 provides the fetched instruction address to the L2 BTB 114 to determine if the L2 BTB 114 stores a BTA for the fetched instruction address. The method flow proceeds to block 314.

At block 314, the L1 BTB 112 indicates a BTB hit or a BTB miss based on whether the L1 BTB 112 stores a BTA for the fetched instruction address. In response to a BTB hit at the L1 BTB 112, the method flow moves to block 316 and the BTB access control module 230 leaves the access count for the identified memory page unmodified. The method flow returns to block 302.

Returning to block 314, if the L1 BTB 112 indicates a BTB miss, the method flow moves to block 318 and the BTB access control module 230 determines if the L2 BTB 114 has indicated a BTB hit for the fetched instruction address. In response to a hit in the L2 BTB 114 for the fetched instruction address, the method flow moves to block 319 and the BTB access control module 230 resets the access count field for the identified memory page to the initial value. The method flow returns to block 302. If, at block 318, the L2 BTB indicates a BTB miss, the method flow moves to block 320 and the BTB access control module increments the access count field for the identified memory page.

Figure 4:
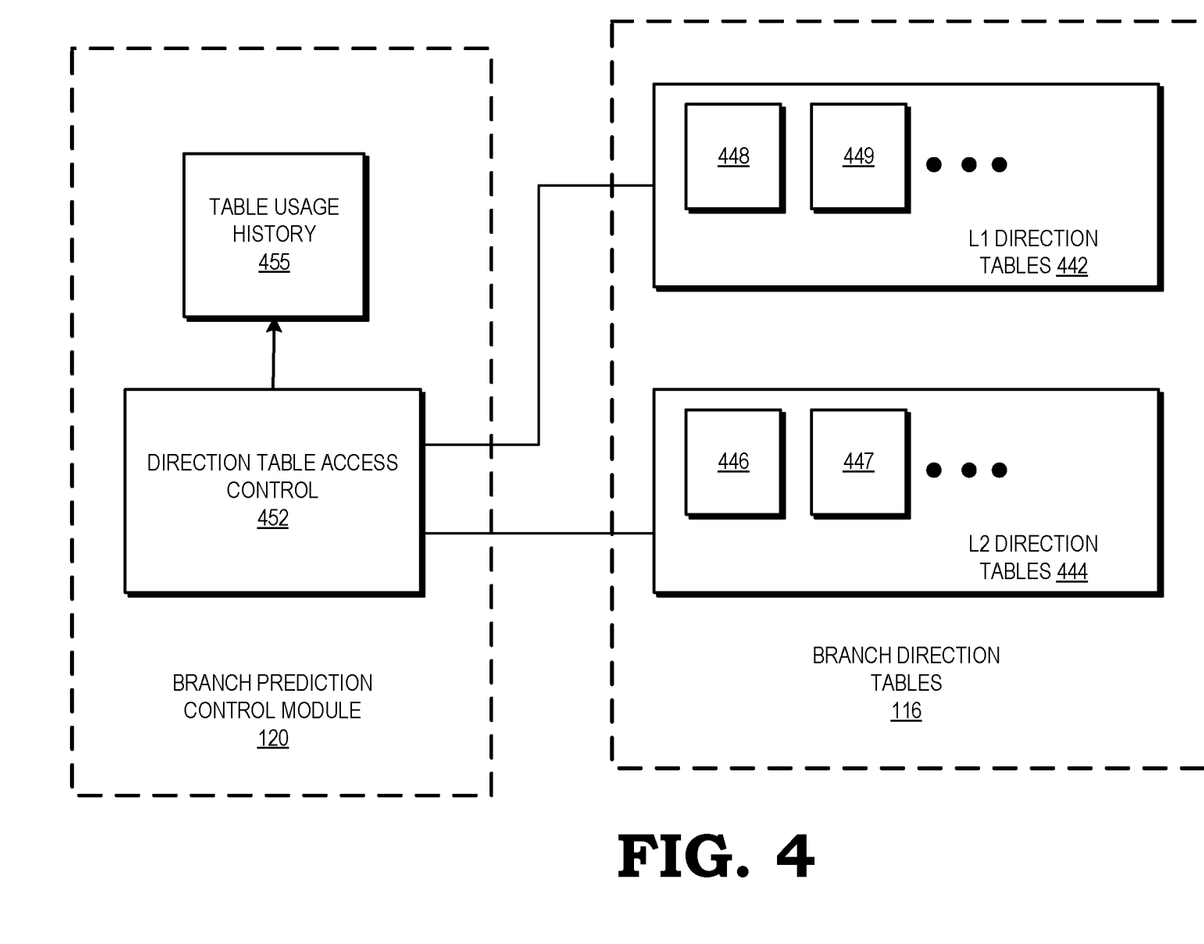
FIG. 4 is a block diagram of a portion of the branch prediction module of FIG. 1 illustrating filtered access to one or more branch direction tables in accordance with some embodiments.

FIG. 4 is a block diagram of portions of the branch predictor 110 of FIG. 1 to manage filtering accesses to at least a subset of the branch direction tables 116 in accordance with some embodiments. In the depicted example, the direction prediction tables are separated into two subsets: a set of L1 direction tables 442 (e.g. L1 direction tables 448, 449) and a set of L2 direction tables 444 (e.g. L2 direction tables 446, 447). The branch prediction control module 120 includes a direction table access control module 452 and a table usage history 455. The direction table access control module 452 identifies which of the L2 direction tables 444 is to provide predictions for branch directions and records the identified L2 direction tables at the table usage history 455. In addition, the direction table access control module 452 identifies, based on the table usage history 455, patterns in which L2 direction tables 444 provide useful predictions and, based on the identified patterns enables or disables access to selected ones of the L2 direction tables 444.

To illustrate via an example, to determine a branch direction for a given prediction window the branch prediction control module 120 accesses each of the L1 direction tables 442 and combines the direction predictions generated by the L1 direction tables 442 according to a specified branch direction algorithm to generate a direction prediction, designated for purposes of description an "L1 direction prediction". Conventionally, the branch prediction control module 120 concurrently accesses each of the L2 direction tables 444, in a similar manner as the L1 direction tables 442, to generate a separate and independent direction prediction, designated for purposes of description an "L2 direction prediction." In the event of a conflict between the L1 and L2 direction predictions, the L2 direction prediction is typically selected, as the L2 direction tables are larger, utilize more branch history, and are more accurate. They are also slower to access than the L1 prediction tables. However, as indicated above, for a given prediction window only a subset of the L2 direction tables 444 are likely to provide a direction prediction. Accordingly, in at least one embodiment the direction table access control module 452 disables access to a selected subset of the L2 direction tables 444, thereby conserving power without substantially reducing the accuracy of the direction prediction.

Figure 5:
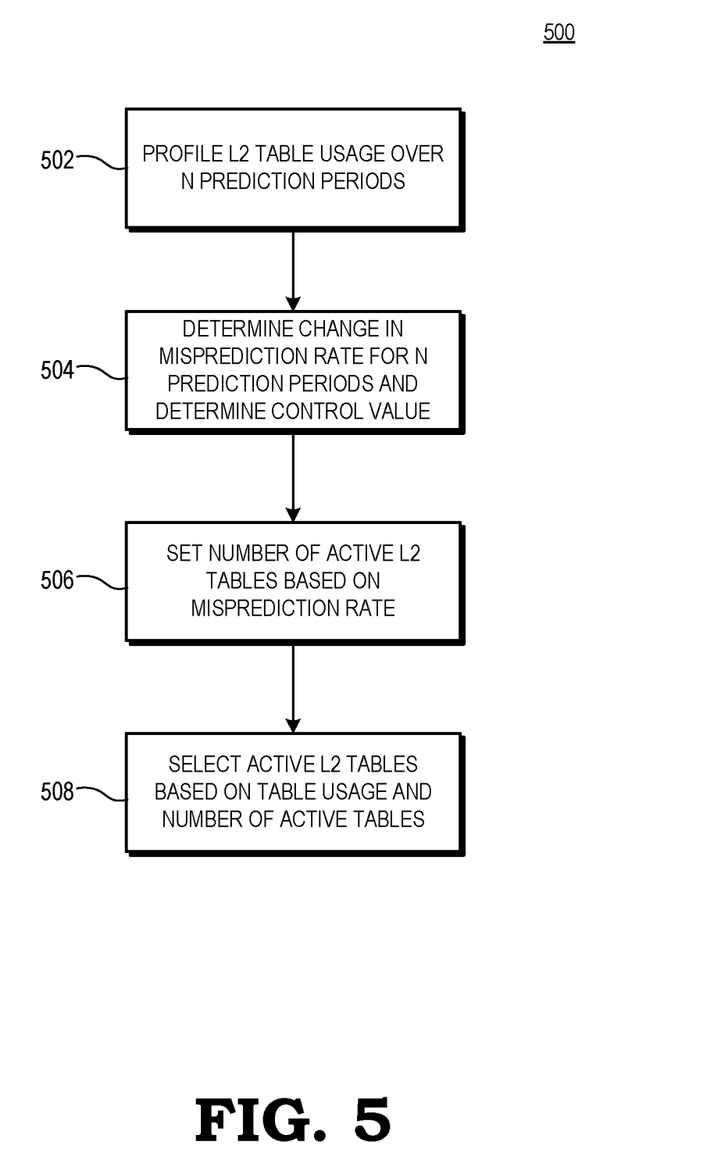
FIG. 5 is a flow diagram of a method of filtering access to one or more branch direction tables based on table usage over specified prediction periods in accordance with some embodiments.
Figure 6:
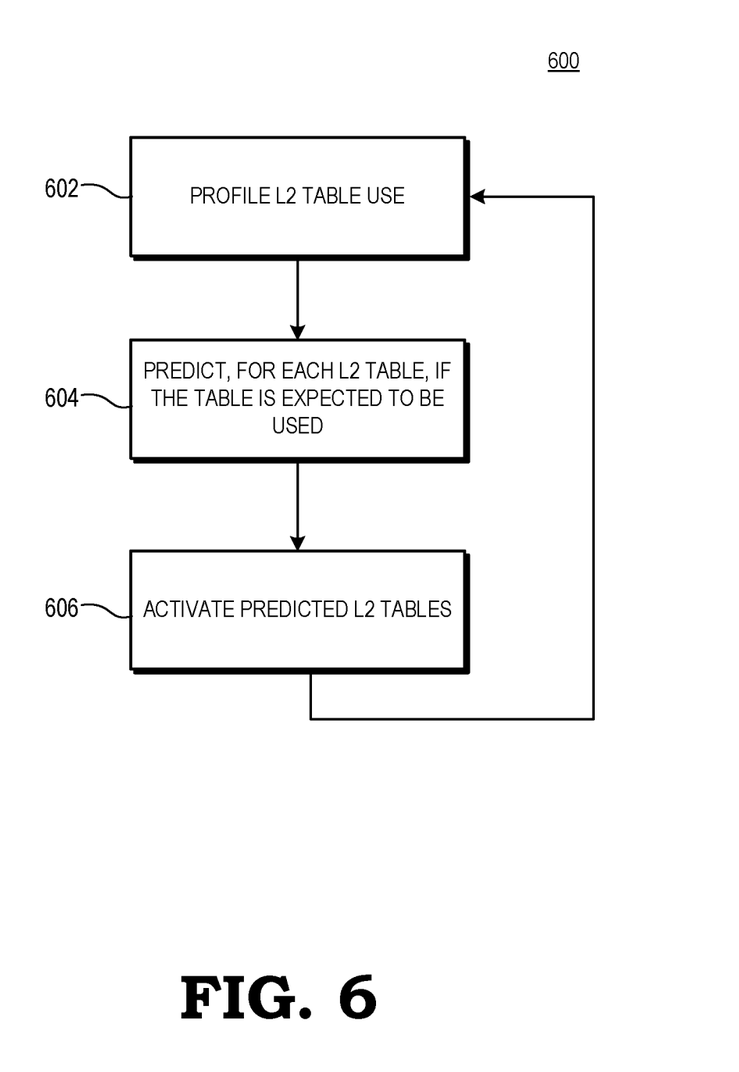
FIG. 6 is a flow diagram of a method of filtering access to one or more branch direction tables based on table usage based on a prediction of table utility in accordance with some embodiments.

Example techniques for identifying the subset of L2 direction tables 444 are illustrated at FIGS. 5 and 6. Turning to FIG. 5, a flow diagram of a method 500 of identifying the subset of L2 direction tables 444 based on table usage over a plurality of prediction windows is illustrated in accordance with some embodiments. At block 502 the direction table access control module 452 employs the table usage history 455 to identify the usage of each of the L2 direction tables 444 over N prediction windows, where N is an integer. Each set of N prediction windows is referred to herein as an "epoch". In at least one embodiment, the direction table access control module 452 identifies that a given L2 direction table is used for a prediction window when there is a tag hit at the L2 direction table during the prediction window.

At block 504 the direction table access control module 452 identifies the direction misprediction rate at the branch predictor 110 for the epoch. In at least one embodiment, the misprediction rate is the number of branch direction mispredictions identified by the processor 100 during the epoch divided by N. The processor 100 identifies direction mispredictions using any of a variety of conventional misprediction identification techniques. Based on the branch misprediction rate, the direction table access control module 452 generates a control value indicative of one or more of the level of direction misprediction for an epoch, the rate at which the direction misprediction rate is changing, and whether the direction misprediction rate is increasing or decreasing.

For example, in some embodiments, the direction table access control module 452 generates a reference misprediction rate calculated for M epochs, where M is an integer. For an epoch, the direction table access control module 452 calculates an error value based on the difference between the misprediction rate for the epoch and the reference misprediction rate. The direction table access control module 452 then calculates the control value using a proportional-integral-derivative (PID) controller based on three components: 1) a proportional component, indicating the misprediction rate for the previous epoch; 2) an integral component, indicating the sum of the error value for the previous epoch; and 3) a derivative component, indicating the difference between the last two error values.

At block 506 the direction table access control module 452 determines a number of active L2 direction tables based on the control value calculated at block 504. For example, if the control value indicates that the misprediction rate is above a threshold, or is increasing at a rate above a threshold, the direction table access control module 452 sets the number of active L2 direction tables at a relatively higher amount. In contrast, if the control value indicates that the misprediction rate is below a threshold, or is increasing at a rate below a threshold, the direction table access control module 452 sets the number of active L2 direction tables at a relatively lower amount. The direction table access control module 452 thereby maintains the misprediction rate within a specified tolerance.

At block 508 the direction table access control module 452 selects a subset of the L2 direction tables 444 to be inactive based on the usage of each of the L2 direction tables 444 over the previous epoch and based on the number of active L2 direction tables identified at block 506. For example, in some embodiments, the direction table access control module 452 selects for the subset those L2 direction tables whose usage in the previous epoch is below a threshold. If the number of L2 direction tables selected for the subset would result in too few active L2 direction tables indicated by the required number calculated at block 506, the direction table access control module removes L2 direction tables from the subset until the required number is satisfied. After selecting the subset of inactive L2 direction tables 444, the direction table access control module 452 suppresses accesses to the selected subset during the following epoch.

FIG. 6 illustrates a flow diagram of a method 600 of identifying the subset of L2 direction tables 444 based on predicted table usage for each epoch in accordance with some embodiments. With respect to the method 600, it is assumed that the direction table access control module 452 monitors the usage of each the L2 direction tables 444 during each prediction window and records the usage at the table usage history 455. In at least one embodiment, direction table access control module records, for a specified period (such as a specified number of past prediction windows) the usage pattern of each L2 direction table 444 by storing a one at a corresponding bit position of a table entry if the corresponding L2 direction table has indicated a tag match and stores a zero at the corresponding bit position if the L2 direction table has indicated a tag miss.

At block 602, the direction table access control module 452 accesses the table usage history 455 to profile the usage of the L2 direction tables 444. In some embodiments, the direction table access control module 452 identifies patterns using branch prediction techniques ordinarily employed to predict branch direction. At block 604, based on the identified patterns, the direction table access control module 452 predicts, for each of the L2 direction tables 444, if the corresponding table is expected to be used during the next prediction window. At block 606, the direction table access control module activates for the next prediction window the L2 direction tables that were predicted to be used at block 604. Accordingly, during the next prediction window, the direction table access control module 452 accesses only those L2 direction tables that were activated. The direction table access control module thereby conserves power while maintaining branch prediction accuracy. The method flow returns to block 602 for the next prediction window.

In some embodiments, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM), or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
maintaining an access count for each of a plurality of memory regions;
in response to fetching a first instruction for execution at a fetch stage of an instruction pipeline of a processor:
identifying, of the plurality of memory regions, a first memory region that includes a first instruction address associated with the first instruction;
determining whether the maintained access count for the first memory region exceeds a defined threshold; and
in response to determining that the maintained access count for the first memory region exceeds the defined threshold, providing the first instruction address to only a first branch target buffer (BTB), and otherwise providing the first instruction address to the first BTB and to a second BTB.

2. The method of claim 1, wherein the second BTB is a victim buffer for the first BTB.

3. The method of claim 1, wherein:
maintaining the access count for the first memory region includes identifying a first quantity of accesses to the first memory region based on a table storing a plurality of counts of accesses, each of the plurality of counts associated with a different memory region.

4. The method of claim 1, further comprising:
incrementing a BTB counter in response to a first access miss at the second BTB.

5. The method of claim 4, wherein:
incrementing the BTB counter comprises incrementing the BTB counter in response to the first access miss at the second BTB and a second access miss at the first BTB.

6. The method of claim 5, further comprising:
resetting the BTB counter in response to an access hit at the second BTB.

7. The method of claim 5, further comprising:
resetting the BTB counter in response to transferring a branch target address to the second BTB from the first BTB.

8. A processor comprising:
an instruction pipeline including a fetch stage configured to fetch a first instruction having a first instruction address; and
branch predictor circuitry comprising:
- a first branch target buffer (BTB) and a second BTB, each of the first BTB and second BTB configured to provide branch target addresses to the instruction pipeline; and
- branch prediction control circuitry configured to:
  - identify, from a plurality of memory regions, a first memory region that includes the first instruction address, wherein a respective access count is maintained for each memory region of the plurality of memory regions;
  - determine whether the maintained access count for the first memory region exceeds a defined threshold; and
  - in response to determining that the maintained access count for the first memory region exceeds the defined threshold, provide the first instruction address to only the second BTB, and otherwise provide the first instruction address to the first BTB and the second BTB.

9. The processor of claim 8, wherein the first BTB is a victim buffer for the second BTB.

10. The processor of claim 8, wherein the branch prediction control circuitry is configured to:
identify the maintained access count for the first memory region based on a table storing a plurality of access counts that are each associated with a different memory region.

11. The processor of claim 8, wherein the branch prediction control circuitry is configured to:
increment a BTB counter in response to a first access miss at the first BTB.

12. The processor of claim 11, wherein the branch prediction control circuitry is configured to:
increment the BTB counter in response to the first access miss at the first BTB and a second access miss at the second BTB.

13. The processor of claim 11, wherein the branch prediction control circuitry is configured to:
reset the BTB counter in response to an access hit at the first BTB.

14. The processor of claim 11, wherein the branch prediction control circuitry is configured to:
reset the BTB counter in response to transferring a branch target address to the first BTB from the second BTB.

* * * * *